May 17, 1955 F. J. NEWHOUSE ET AL 2,708,396
TWO-WAY PLOW
Filed March 31, 1953 3 Sheets-Sheet 1

INVENTORS
FRANK J. NEWHOUSE
LESLIE L. KEPKAY
BY
James E. Nilles
ATT'Y

May 17, 1955

F. J. NEWHOUSE ET AL 2,708,396

TWO-WAY PLOW

Filed March 31, 1953

INVENTORS
FRANK J. NEWHOUSE
LESLIE L. KEPKAY
BY

James E. Nilles

ATT'Y

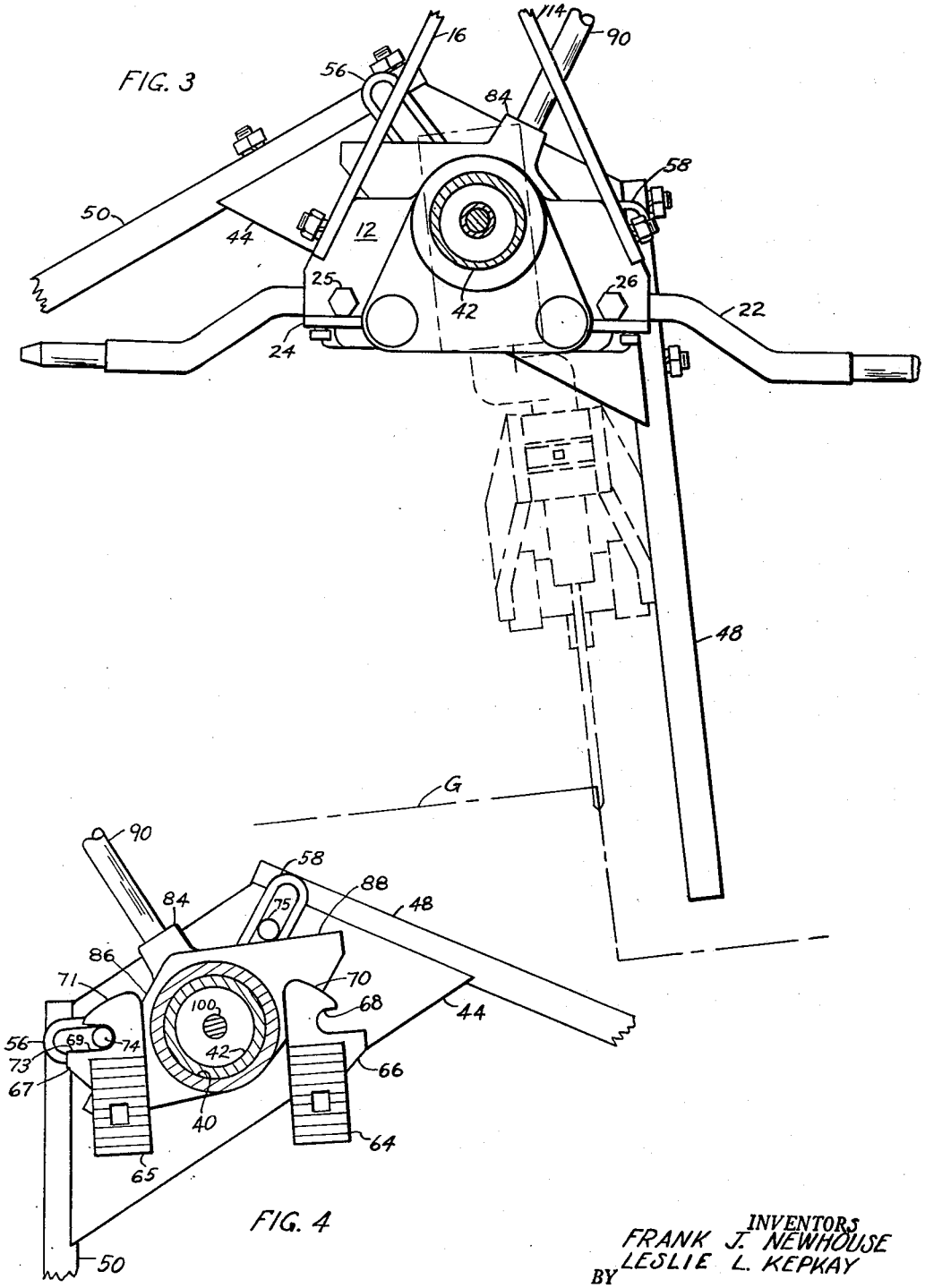

United States Patent Office 2,708,396
Patented May 17, 1955

2,708,396
TWO-WAY PLOW

Frank J. Newhouse and Leslie L. Kepkay, Toronto, Ontario, Canada, assignors to Massey-Harris-Ferguson Limited, a corporation of Canada Application March 31, 1953, Serial No. 345,848

6 Claims. (Cl. 97—26)

This invention relates to plows and more particularly to that type of plow known as a two-way roll-over plow which has oppositely pitched bottoms adapted to alternately swing into and out of operating position and it is generally an object of this invention to improve the structure and operating characteristics of such a plow.

One object of this invention is to provide a two-way plow of this type which is adapted to be carried by, and closely coupled to, the tractor and which is compact, simple to operate and efficient in performing the functions for which it is designed.

When a roll-over plow of this type is closely coupled to the tractor, there is insufficient space between the laterally spaced lower hitch links to accommodate the swinging movement of the conventional coulters which are carried at the forward end of the implement. It is therefore an object of this invention to provide a two-way plow of the roll-over type having a single coulter which is automatically moved to, and aligned in, the correct position for serving either left or right plow bottoms when the plow frame is rotated.

In hilly areas it is desirable and often necessary to operate the tractors with the widest wheel tread possible for maximum stability of the vehicle. To use a two-way plow with a wide tread tractor, however, it is impossible to have the plows operating on a center line with the tractor but, rather, they must be positioned offset in the direction of the tractor wheel which is in the furrow. This somewhat complicates the correct positioning of the single coulter in serving either a left or right hand bottom. It is an object of this invention to provide a novel means for giving the proper offset to the coulter and also providing a novel means for tilting the coulter assembly in a direction opposite to that to which the plow frame rotates so as to correctly align the coulter with the plow bottom being used.

It is an object of this invention to provide a two-way plow having improved means for changing and positioning the plow bottoms.

It is a more specific object of this invention to provide a rotatable plow frame carried by a hitch frame and having a manually operated means to unlock the plow frame from one operating position, rotate it to and correctly position it in its other operating position and securely lock it therein, all being done simply by shoving a single lever in one direction.

These and other objects and advantages will appear more fully as the description proceeds, having reference to the drawings in which:

Figure 3 is a front elevational view, taken on line 3—3 of Fig. 2, showing the plow frame when the left bottom is in operating position, with the plow bottoms removed and showing the coulter and its supporting bracket in phantom.

Figure 4 is a cross sectional view taken on line 4—4 of Fig. 2 of the cam and latch mechanism for positioning and locking the plow frame.

Figure 5 is a view taken on line 5—5 of Fig. 2 of the motion plate.

Figure 1:
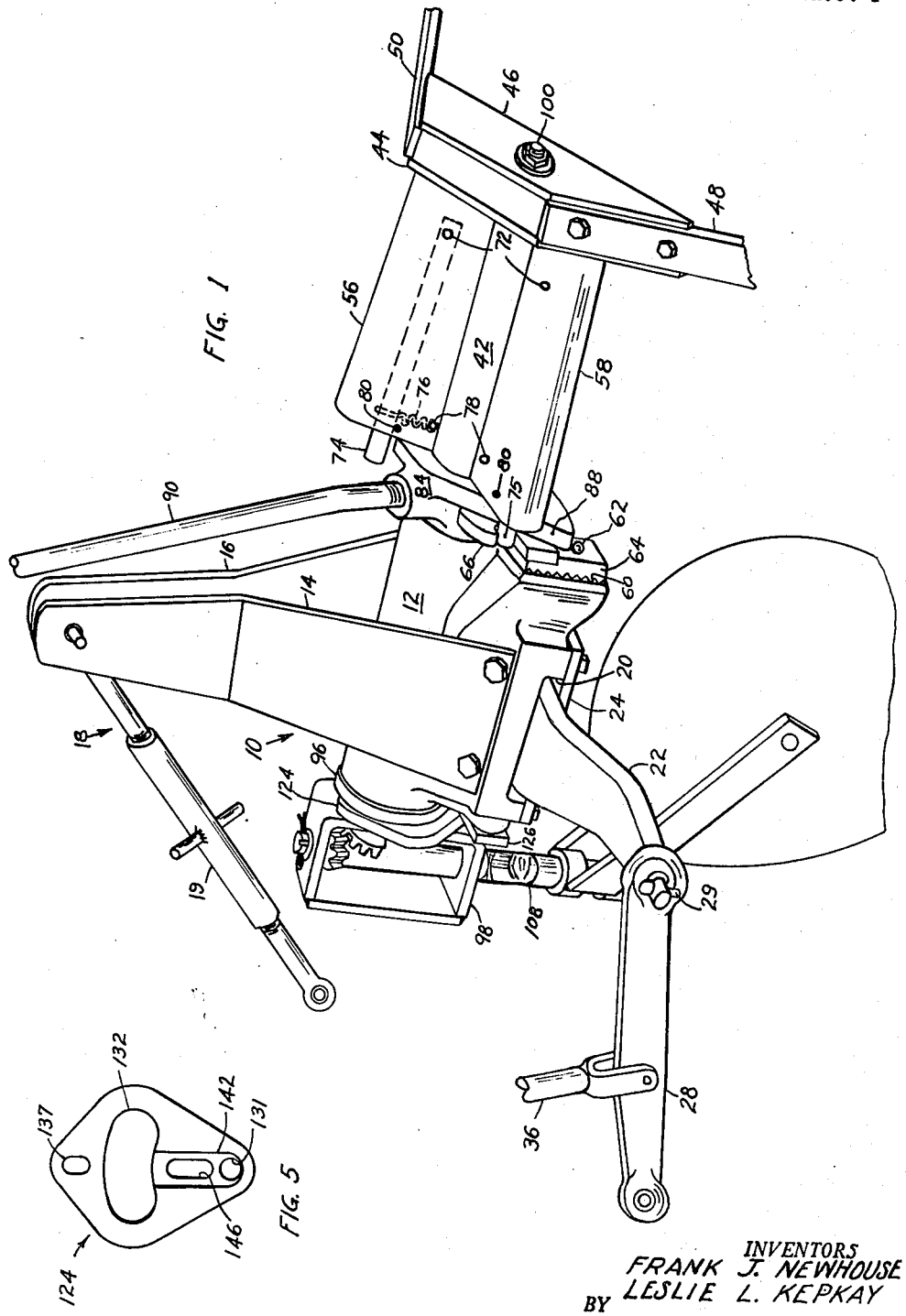
Figure 1 is a perspective view of the plow showing the position of the plow frame when the left plow bottom is in the working position.
Figure 2:
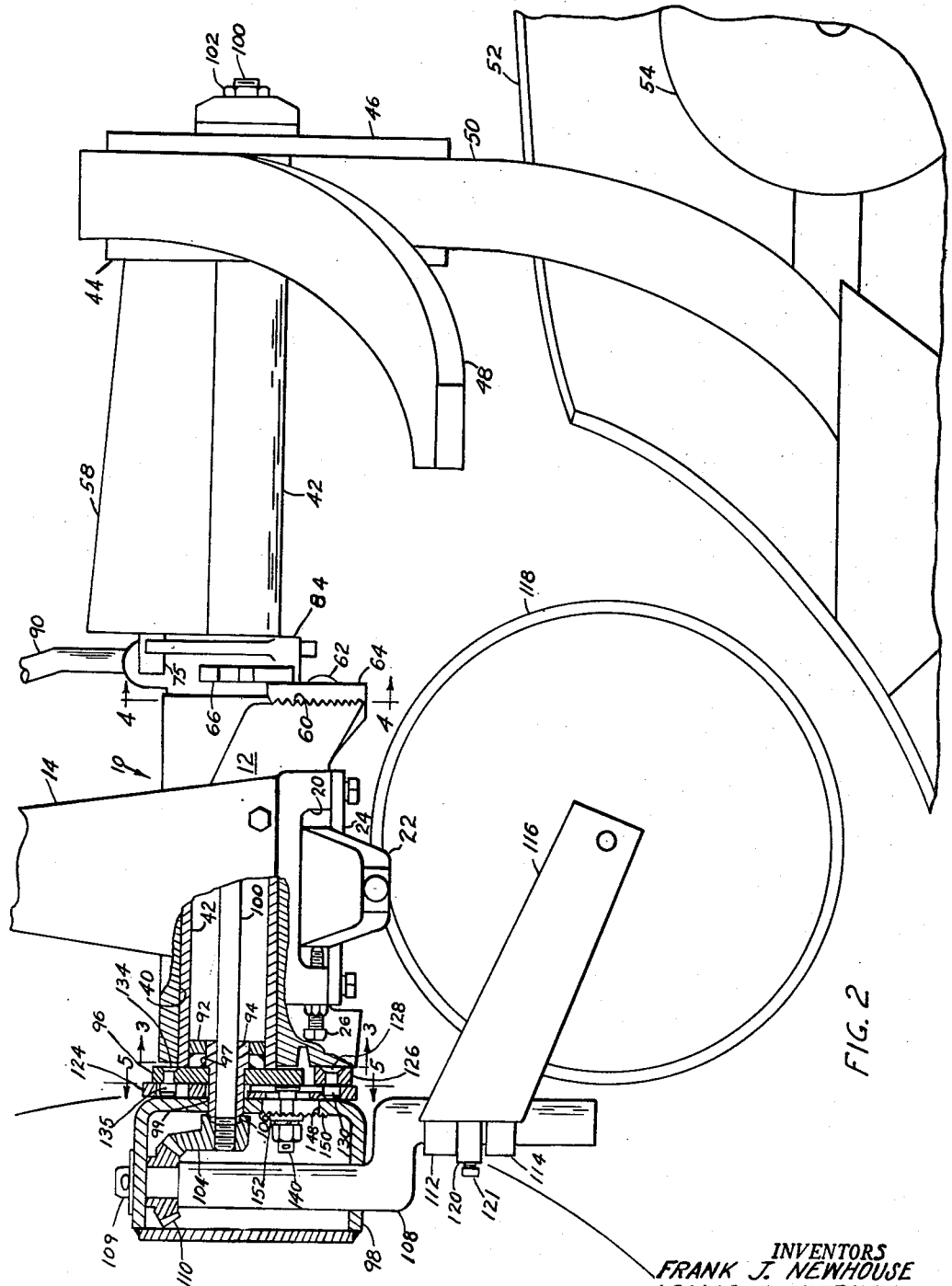
Figure 2 is an elevational view, partially in section, showing the right bottom in the operating position; the left bottom and the hitch links have been removed for the sake of clarity.

Referring more particularly to the drawings, the hitch frame, indicated generally at 10, comprises a casting 12 to which are bolted or otherwise secured two vertically arranged plate members 14—16 which form an upwardly extending pedestal. A compression link 18 is pivotally attached between the upper ends of members 14—16 and is adjustable in length by means of a threaded sleeve 19 to vary the suck of the plow. The casting 12 has a transversely positioned slot 20 at the underside to receive the drawbar 22. A plate 24 is bolted to the underside of casting 12 and holds drawbar 22 within this slot. The drawbar 22 is pivotally mounted intermediate its length by means of a pivot pin (not shown) which is located at the center of the drawbar and extends therethrough into bearing surfaces in the casting 12 and the plate 24. This drawbar is adjustable about this pivot point, for changing the width of the furrow, by means of adjusting screws 25—26 located at either side of the casting 12 and threadably engaged therewith. Tension hitch links 28 are connected by means of universal joints to the ends of the drawbar and are retained in place by a keeper pin 29. The forward ends of the three hitch links 18 and 28 are connected to the tractor. Power lift means on the tractor vertically position the implement through lift arms 36 in the conventional manner.

The casting 12 has extending entirely therethrough, in a longitudinal direction, a bore 40 in which is rotatably mounted a tubular member 42. Rigidly secured to the rear end of tubular member 42 is a support structure comprised of plates 44—46 to which are rigidly secured left and right plow standards 48, 50. At the lower end of either standard is attached the conventional plow bottom 52 and gauge wheel 54. Also secured to tube member 42 along its length are two U-shaped members 56—58. These U-shaped members are welded to the tube member 42 and to plate member 44 to form a rigid and integral plow frame. Thus the plow frame rotates in bore 40 to swing either the left or right bottom into operating position.

The means for unlocking the plow frame, selecting the bottom to be used and locking it in position will now be described. At either side of the rear end of casting 12 are serrated portions 60. Secured to each of these serrated surfaces by means of bolts 62 are serrated blocks 64—65. Welded to blocks 64—65 are slotted members or hooks 66—67 having outwardly extending slots 68—69 and rounded top surfaces 70—71, best shown in Figure 4. The blocks 64—65 are thus adjustably secured to the casting 12 in order that the plow bottoms may be leveled from side to side as will appear hereinafter. Within each U-shaped member 56—58 are pivotally attached, by means of pins 72, rods 74—75 which are adapted to be received by the slots 68—69. The rods 74—75 are yieldingly urged in an inwardly direction, that is, towards their respective slots by springs 76 which are secured to members 56—58 by means of pins 78 extending therethrough. The other ends of the springs are secured to rods 74—75 in any suitable manner. Other pins 80 extend through members 56—58 and prevent the rods from swinging too far inwardly and thus preventing proper contact with rounded top surfaces 70—71 of members 66—67. A cam member 84 is rotatably mounted on tube member 42, between casting 12 and members 56—58, and has two cam surfaces 86—88 which engage rods 74—75 respectively. As shown in Figure 1, the left hand plow bottom is in the locked position and in order to rotate the plow frame and place the right hand bottom in operation, the operator from the tractor seat would simply grasp the upper end of control handle 90, which is secured to cam member 84, and rotate it toward the right side. This causes cam surface 88 to swing the rod 75 out of its corresponding slot 68, thereby unlocking the plow frame during the initial stage of movement of the control handle 90. It is necessary for the operator to merely give the handle a shove in the desired direction and further attention on his part is unnecessary in order to lock the plow in the proper position, as the rod 74 will bear on the round top surface 71 and swing outwardly until it abuts against the lower surface 73 of the slot at which time the spring 76 will urge the rod 74 into locking engagement with the member 67. It can thus be seen that positioning the plow frame is a simple matter, requiring only a shove of the control handle 90. There is no need to first release the control handle from a ratchet and detent or similar means and no attention is required on the operator's part in selecting the proper position for the next plowing operation. Rather, with this device the single movement of the control hand unlocks the plow frame, rotates the plow frame and locks it in the correct position at the opposite side.

A novel means is provided which enables a single coulter to serve either left or right plow bottom and automatically correctly positions and aligns the coulter for either bottom. Inside the forward end of tube 42 a bearing support 92 is welded having a square hole at its center for the reception of bushing 94. The intermediate part 99 of bushing 94 is round in cross section and receives plate 96 to which it is welded as at 97. The coulter supporting bracket 98 is rotatably mounted on this round portion 99 of bushing 94. A rod 100 extends through tube 42 and has a nut 102 threadably engaged on the rear end while at the forward end a segmental bevel gear 104 is threadably engaged. The bevel gear 104 has a square counterbore which receives a further reduced forward portion 106 of the bushing 94 which is also square in cross section and prevents any relative rotation between the gear 104 and the bushing 94. Therefore, the plow frame, plate 96, and gear 104 all rotate together as an integral unit and there is no relative movement between these parts when the nut 102 is drawn taut. It will be noted that this arrangement facilitates assembly and disassembly of the entire structure.

Rotatably mounted in bracket 98 is a crank shaped coulter post 108 having a reduced portion 109 at the upper end to which is keyed a bevel pinion 110 which mates with the segmental bevel gear 104. At the lower end of the post 108 are rotatably mounted collars 112—114 to which are welded coulter arms 116. The coulter 118 is rotatably mounted between the lower ends of arms 116. A collar 120 having a set screw 121 is positioned between the collars 112—114 and holds them in any desired vertical position on the coulter post. Thus, the rotation of the plow frame through rod 100 and bevel gears 104—110 serves to rotate the coulter post and properly offset the coulter, due to the throw out in the crank post, in a proper relation to the plow bottom being used.

In addition to rotating the coulter crank, it is necessary to tilt the entire coulter assembly. This rotation or tilt of the entire coulter assembly is in a direction opposite to that in which the plow frame is being rotated. For instance, referring to Figure 3 which shows the left bottom in the operating position, when it is desired to use the right hand plow bottom, the plow frame would be rotated in a counterclockwise direction. In this figure the drawbar is shown in a horizontal position or that occupied when both tractor wheels are on level ground. However, when the tractor wheel is in the furrow, the ground line would be as indicated at G. It can be seen that it is necessary, therefore, to rotate the entire coulter assembly from the position shown in Figure 3 in a clockwise direction when it is desired to use the right hand plow bottom. To automatically accomplish this required tilt of the coulter assembly, we provide a motion plate 124 between the coulter bracket 98 and plate 96. At the lower forward end of the casting 12 is bolted, or otherwise rigidly secured, a transversely positioned support bar 126. The motion plate 124 is pivotally mounted to this support bar 126 by means of a bolt 128 having an enlarged bearing surface 130 at the forward end which is inserted in the hole 131 in motion plate 124. An arcuate slot 132 is provided in the motion plate to allow it to freely swing past bushing 94. The swinging movement is imparted to the motion plate, when the plow frame is rotated, through the plate 96 which rotates with the plow frame as previously described. Plate 96 at its upper side has a bolt 134 extending therethrough having an enlarged forward portion 135 which is inserted in the vertical slot 137 in motion plate 124. Movement is transmitted from the motion plate to the coulter bracket 98 by means of a bolt 140. For this purpose the motion plate has a channel 142, best shown in Figure 5, in which slides the head of bolt 140. A slot 146 is formed through the motion plate 124 within this channel in which slides the bolt 140. The intermediate portion of bolt 140 is smaller in diameter than the head portion but larger than the rear portion which extends through bracket 98. Therefore, the intermediate portion bears against the rear side of bracket 98 and thus the nut can be tightened but still allow the head portion of the bolt to slide freely in motion plate 124. A vertically positioned slot 148 is located on the inner side of bracket 98 and a serrated surface 150 is formed on the front portion of this side. A square shaped washer 152 which bridges the slot 148 also has a corresponding serrated surface which mates with the serrated surface 150. Thus the vertical position of the bolt 140 can be fixedly adjusted to determine the extent of throw given to bracket 98 by the motion plate 124 and thereby determines the amount of rotation imparted to the coulter assembly.

It can now be seen that a novel means has been provided for positioning the coulter crank in the proper offset relationship to the centerline and also automatically tilting the entire coulter assembly in a direction opposite to that in which the plow frame rotates.

Having thus shown and described our invention, we claim:

1. In a two-way plow of the roll-over type adapted to be carried by a tractive vehicle in closely coupled relation thereto: a hitch frame supported by said vehicle and having a longitudinally arranged bore extending therethrough; a plow frame comprising a tubular member rotatably mounted within said bore and extending rearwardly therefrom, plow standards rigidly secured adjacent the rear end of said tubular member for supporting oppositely pitched plow bottoms, a coulter bracket rotatably mounted at the forward end of said tubular member, a coulter crank post rotatably mounted in said bracket, gear means forming an operating connection between said plow frame and said crank post to rotate said crank post to that side having the bottom in operating position, a motion transmitting plate pivotally attached to the hitch frame and operatively connecting said plow frame to said bracket to rotate said bracket in a direction opposite to that in which the plow frame rotates so as to correctly align the post with the bottom being used.

2. A device according to claim 1, including: releasable latch means between said hitch frame and said plow frame for locking the latter in either of two positions; a positioning member having a control handle, rotatably mounted on said tubular member adjacent the rear end of said hitch frame and adapted to unlock said latch means and rotate said plow frame.

3. A device as set forth in claim 1 including: an adjustable connection between said motion plate and said bracket to vary the extent of throw given to said crank post when said plow frame is rotated.

4. In a two-way, roll-over plow carried by a tractor in closely coupled relation thereto: a hitch frame, a plow frame rotatably mounted on said hitch frame and having oppositely pitched bottoms for alternately swinging into and out of operating position; a hook member, having an open slot, secured to the rear end of said hitch frame at either side thereof, and also having a round top surface tapering toward the open end of said slot, said slot having a lower surface extending laterally beyond said round top surface, a rod pivotally attached to either side of said plow frame, resilient means adapted to urge said rod into engagement with said slot, stop means on said plow frame to insure contact of said rod with said round top surface when said plow frame is being positioned; a positioning member, having an operator's handle controllable from said tractor, rotatably mounted between said hitch frame and said plow frame and having a cam surface at either side to remove the corresponding rod from its slot when said handle is moved.

5. A device according to claim 4 further characterized in that, said hook members are adjustably secured to said hitch frame to level said bottoms in a transverse direction.

6. In a two-way plow of the roll-over type adapted to be carried by a tractive vehicle in closely coupled relation thereto: a hitch frame supported by said vehicle and having a longitudinally arranged bore extending therethrough; a plow frame rotatably mounted within said bore and extending rearwardly therefrom, plow standards rigidly secured adjacent the rear end of said plow frame for supporting oppositely pitched plow bottoms, a coulter bracket rotatably mounted at the forward end of said plow frame, a coulter crank post rotatably mounted in said bracket, means forming an operating connection between said plow frame and said crank post to rotate said crank post to that side having the bottom in operating position, motion transmitting means pivotally attached to the hitch frame and operatively connecting said plow frame to said bracket to rotate said bracket in a direction opposite to that in which the plow frame rotates so as to correctly align the post with the bottom being used.

References Cited in the file of this patent

UNITED STATES PATENTS

| | | |
|---|---|---|
| 2,364,367 | Janke | Dec. 5, 1944 |
| 2,616,346 | Silver | Nov. 5, 1952 |
| 2,633,787 | Nelson | Apr. 7, 1953 |
| 2,637,256 | Lindeman | May 5, 1953 |